Jan. 21, 1936.    J. C. BERRY    2,028,311
FISHING REEL
Filed June 13, 1933    2 Sheets-Sheet 1
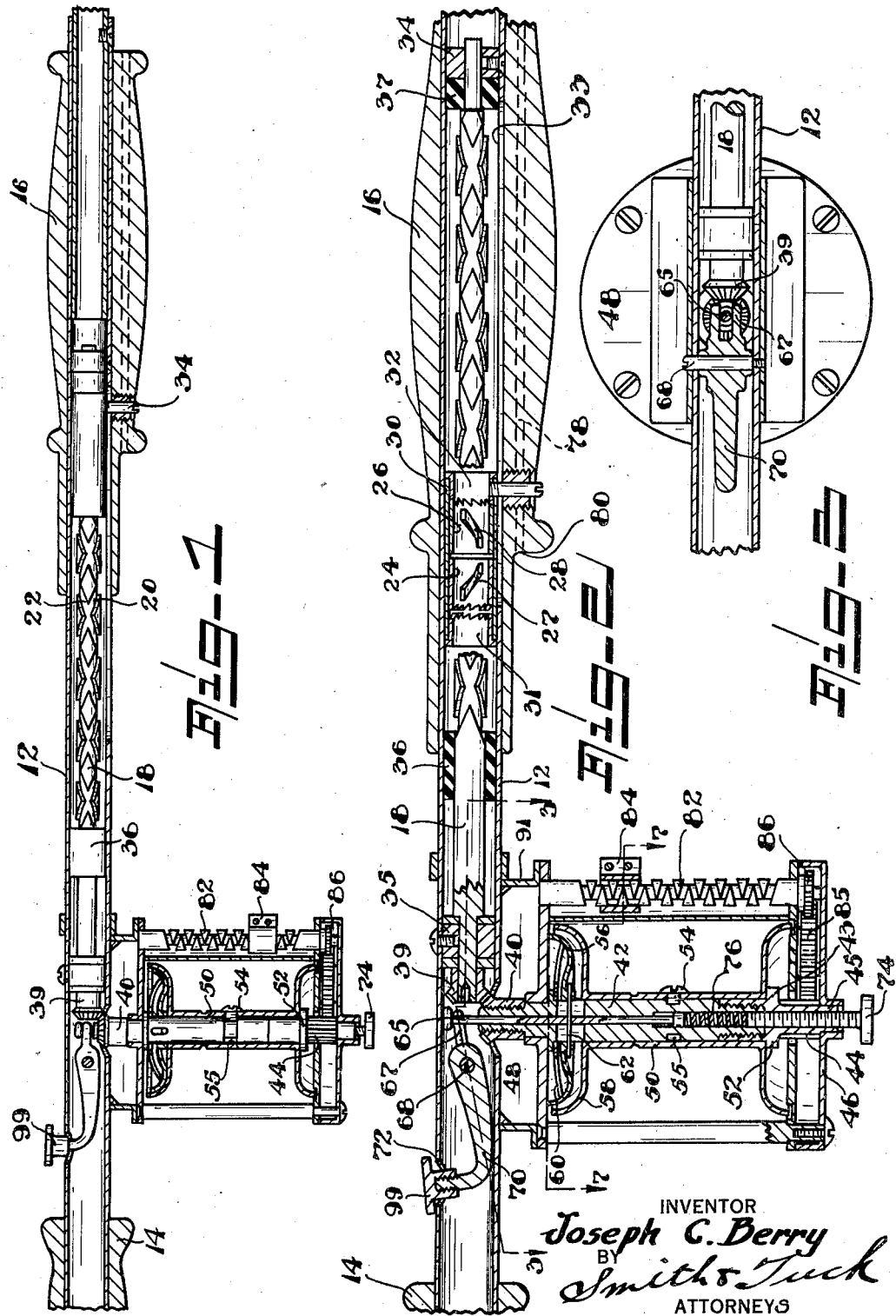
INVENTOR
Joseph C. Berry
BY Smith & Tuck
ATTORNEYS

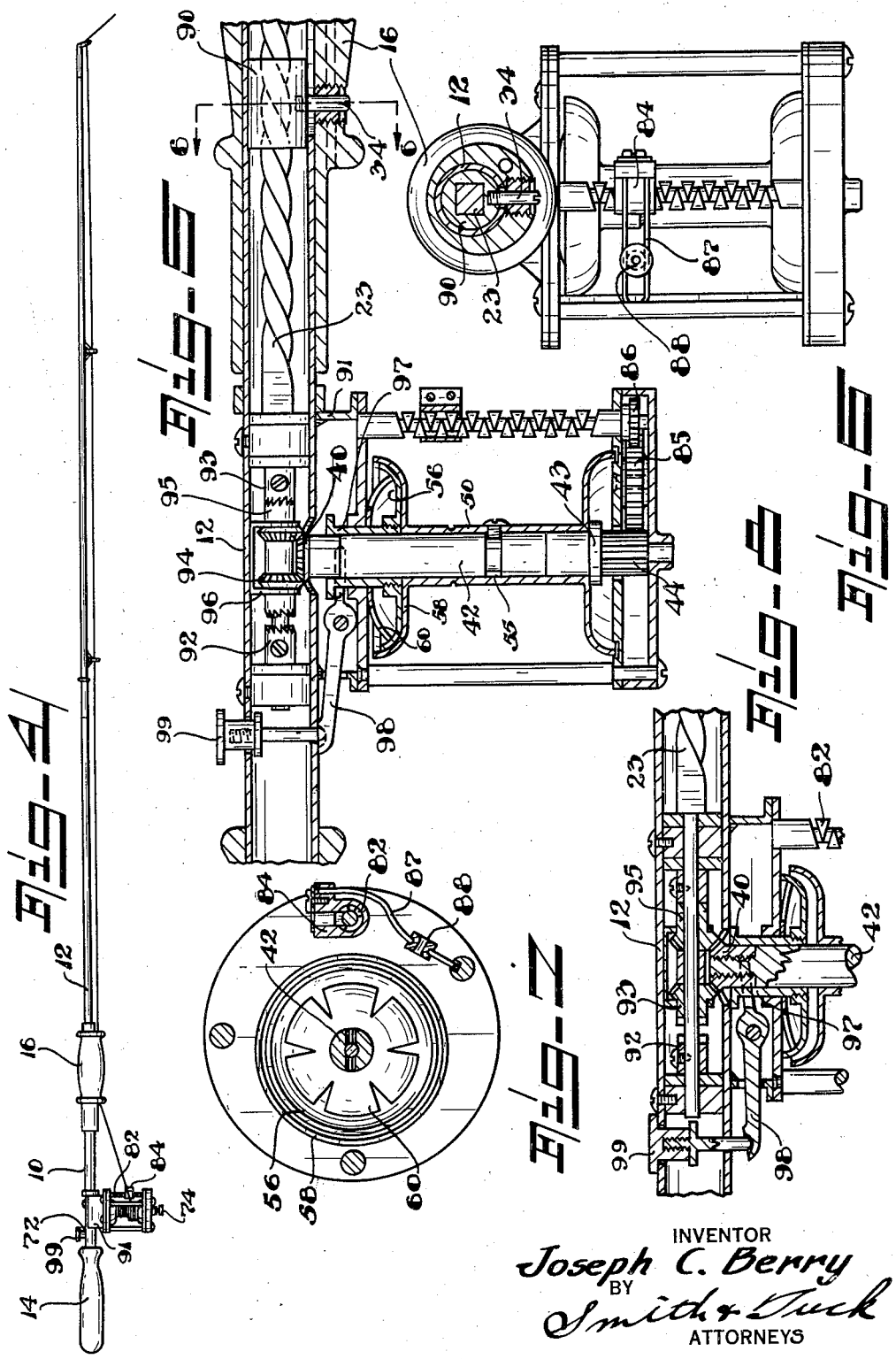

Patented Jan. 21, 1936

2,028,311

UNITED STATES PATENT OFFICE 2,028,311

FISHING REEL

Joseph Calvin Berry, Seattle, Wash., assignor to Utility Electric and Machine Works, Inc., Wheeler, Oreg.

Application June 13, 1933, Serial No. 675,621

4 Claims. (Cl. 43—20)

My present invention relates to the art of fishing tackle and more particularly to a fishing reel which is intended for mounting in combination with a fishing rod handle and is characterized by being so arranged that the reel itself is revolved by a reciprocatory movement of a hand grip forming part of the rod handle.

I am fully aware that numerous attempts have been made to create a reel and fish pole handle combination but in all instances that have been observed however the designs are characterized by a plurality of outwardly extending elements and of exposed parts which aside from creating a very obtrusive appearance were so difficult to manipulate as to nullify any value present in such a design. In my present arrangement I believe I have eliminated these objectionable features of the former development of this equipment.

The principal object of my present invention is to provide a combination reel and fish pole handle so arranged that there are no exposed working parts and which may be properly manipulated without the operator taking his hands off the normal grip portions of the rod handle.

A further object of my present invention is to provide means whereby a reversible reciprocatory movement of a hand grip forming part of the pole handle is converted into a continuous unidirectional rotary movement of the reel spool.

A further object of my present invention is to provide a reel operatable by a reciprocatory movement which has the features normally required of a casting reel, namely, that it has an adequate and adjustable brake and that it will operate easily as a free spool reel for casting purposes.

A further object of my invention is the production of a reel of the character described in which all the various functions required of a casting reel are supplied without any undue strain being put on any one part so that excessive wear might be encountered.

Other and more specific objects will be apparent from the following description taken in connection with the accompanying drawings, wherein, Figure 1 is a longitudinal sectional view thru my reel and the operating mechanism contained in the pole handle.

Figure 2 is an enlarged sectional view in which all the various parts are shown in section and with the clutch arrangement in its released position.

Figure 3 is a fragmentary longitudinal sectional view taken along the line 3—3 of Figure 2.

Figure 4 is a view showing a complete casting pole made after the teachings of my present invention.

Figure 5 is an enlarged longitudinal sectional view similar to Figure 2 but showing a modified form of construction.

Figure 6 is a cross sectional view along the line 6—6 of Figure 5.

Figure 7 is a cross sectional view along the line 7—7 of Figure 2.

Figure 8 is a fragmentary sectional view similar to Figure 5 but showing the mechanism in more complete sectional view and with the clutch mechanism in its released position.

Referring to the drawings, throughout which like reference characters indicate like parts, 10 designates generally a handle for a fishing pole which is suitable for use with my invention. This consists of a tubular body portion 12, a fixed hand grip 14 and a slidable hand grip 16. Disposed within tubular member 12 is a spiral cut or formed rod 18. In the form shown in Figure 1 I have indicated a double spiral arrangement such as is found in spiral screw drivers of the reversible type. This has a right and left hand thread arrangement indicated at 20 and 22. In the form shown in Figure 5 however I have used a single thread upon a member similar to 18 which for clearness will be identified as 23.

Adapted to engage spirals 20 and 22 are the tubular floating clutch members 24 and 26. These are arranged to encircle shaft 18 and to have inwardly extending lugs as 27 and 28 respectively which are adapted to engage one in each of the two oppositely faced spiral grooves 20 and 22. The floating clutch members 24 and 26 are enclosed and confined by an outer tubular member or sleeve 30. At each end of sleeve 30 are similar but oppositely faced fixed clutch members 31 and 32. In addition to being oppositely faced these members have teeth on their inwardly extending ends that are also oppositely pitched. The floating clutch members 24 and 26 each have teeth mating respectively with members 31 and 32. Further a reasonable amount of clearance is provided in the overall spacing of members 31 and 32 so that as the sleeve 30 is moved longitudinally up shaft 18 one clutch only will engage at a time, the other clutch having sufficient clearance so as to be free of its fixed member.

Outer sleeve 30 is arranged to be fixedly secured to handle 16 as by the set screw 34 which is disposed to operate in a slot 33 cut in the tubular body member 16. Shaft 18 is provided with bearings as 34' and 35 which in turn are screw fastened to tube 16. Further, to facilitate smooth operation of my device I provide at each end of the travel of sleeve 30, preferably, rubber bumpers indicated at 36 and 37. It is not essential that these bumpers be of rubber, they might be of any resilient material or even coil springs. Secured to the lower end of shaft 18 is a drive pinion 39 which mates with a companion miter gear 40.

Gear 40 is fixedly secured, as by threading thereto, to spool shaft 42. Shaft 42 might be continuous and go entirely thru the reel assembly, however, as a manufacturing expedient I find it most desirable to secure a sub-shaft member 43. It is secured to shaft 42 as by the male and female thread illustrated in Figure 2. Sub-shaft 43 in the present showing has a spur pinion 44 cut thereon and outwardly from the pinion a bearing portion 45 which is journaled in a bearing formed in the end plate 46 of the reel proper. The opposite end of shaft 42 is journaled in the inner end plate 48.

Revolvably mounted upon shaft 42 is the line holding reel 50. This reel or spool is normally free floating on shaft 42 and is held in loose engagement with shoulder 52 of sub-shaft 43, by means of a set screw 54 which is adapted to ride in the annular groove 55 cut in shaft 42. Driving engagement between shaft 42 and spool 50 is accomplished by means of the friction clutch member 56 which is adapted to frictionally engage the end plate 58 of spool 50. The engaging surfaces of members 58 and 56 being curved or beveled to provide a secure frictional engagement. Clutch member 56 is normally held in driving relationship with flange 58 by means of the disc spring 60. Clutch member 56 is secured in driving relationship to shaft 42 by means of pin 62 which operates within a slot in shaft 42 after the showing of Figure 2. Pin 62 is fixedly secured in operating rod 65 which is disposed coaxially with shaft 42. This member is provided with an enlarged head so as to provide engagement means for the yoke member 67, which yoke member is pivotally supported at 68 and has the operating lever 70 which terminates in turn in a finger button disposed to protrude thru an opening 72 in tube 12. In Figure 1 of the drawings the lever is shown in its normal position in which the clutch member 56 is in its driving relationship with spool 50. In Figure 2 the lever is shown as depressed pulling outwardly on rod 65 and thus relieveing the spool of any frictional driving means.

It has been found desirable to provide an adjusting means whereby the pressure exerted by spring 60 can be varied at the will of the operator. In my present showing I have indicated this as adjustable by means of the finger operated screw 74 which actuates a coil spring 76 and which in turn is adapted to urge rod 65 towards the handle side of the reel thus decreasing the spring pressure upon clutch member 56.

It has been found most convenient to have the line after it leaves spool 50 pass thru the upper hand grip 16 as thru the drilled opening 78. This is probably best illustrated in Figures 1, 2 and 4. With this arrangement however it has been found that there is considerable angularity between the center of reel 50 and the lower end of hole 78 as indicated at 80 and if means are not provided to prevent it, the line would all spool on the left side of the reel as shown in Figures 1, 2 and 4. To overcome this it has been found desirable to use a spooling device such as is probably best illustrated in Figures 1, 2 and 5. This consists of a reversing thread arrangement on the driven shaft 82. This is arranged to carry nut 84 from side to side after well known principles and this member is further provided with a U-shaped line guide 87 and a movable anti-friction eyelet 88 which is adapted to slide up and down U member 87 so as to best accommodate the line to the spooling operation. Any suitable drive means may be used to drive shaft 82. In the present showing I have indicated a driving gear 44 fixedly secured to shaft 42 then an idle gear 85 and a driven gear 86 which is secured to shaft 82.

In Figures 5, 6 and 8 I have illustrated a slightly modified form of the construction to that previously described, in that shaft 23, which corresponds to shaft 18, of the former construction, is intended to carry either a single thread arrangement or might be of squared material which is twisted to form a long pitched screw or spiral. This calls for certain modifications of the balance of the construction, namely, that instead of the former sleeve 30 I now employ a single sleeve member 90 which is broached to accommodate shaft 23 and slide thereupon. This member 90 is secured to handle 16 after the fashion of the former arrangement, using the same set screws 34 as before. The reel construction is substantially as before having the same spacer or base member 91 but it is now necessary to have a reversing mechanism for the single thread shaft 23 to the end that a continuous rotary movement in one direction will be imparted to the reel as handle 16 is reciprocated back and forth along the tube 12. While there may be many suitable arrangements I have adopted the same general reversing mechanism employed in the other form namely that I have provided two clutch members 92 and 93 which are fixedly secured to shaft 23, which shaft is in turn journaled as before on each side of the driven pinion 40.

To get the desired reversing effect however it is necessary to use instead of the single gear 39 on shaft 23 two gears as 94 and 95 which in this instance are mounted for free rotation on shaft 23 and employ a spacer between them to maintain their relative positions. Further it is necessary to provide as by yoke member 96 suitable backing so that the gears will be retained in constant and proper mesh. The gears 94 and 95 are provided, on their hubs, with toothed clutch members the teeth of which are oppositely pitched and adapted to engage corresponding teeth on members 92 and 93. This detail of construction is best illustrated in Figures 5 and 8. It is further necessary to slightly modify the clutch spring mounting and the method of releasing clutch member 56. This is accomplished by providing a collared sleeve member 97 and using a yoke member 98 somewhat after the former construction and employing a finger button 99 which is positioned relatively in the same position as the former construction.

One feature of this present construction is the ease with which additional reel assemblies can be secured interchangeably to base 91. This is of considerable value to the sportsman who may want to use the same pole handle with different types of poles and at the same time change his line carrying reel to suit the type of fishing expected.

Method of operation

In operating my device a pole of suitable character is fitted into tube 12 which forms the backbone of my handle proper. This pole may be of any suitable style for the character of fishing to be encountered. The line is threaded thru the various guides and thru opening 78 in handle 16 after the showing of Figure 4. When it is desired to cast, as in free spool casting, finger button 72 is depressed thus allowing spool 50 to revolve freely on shaft 42 and pass out the amount of line desired. When the end of the cast is completed, instead of thumbing the reel as in the older types, all that is necessary is to release the pressure on button 72 and clutch member 56 engages its complementary clutch member 58 and slows the spool down or stops it abruptly at the will of the operator.

If the operator now wishes to reel in his line this is accomplished by working handle 16 back and forth in reciprocatory motion and with a stroke equal to the free threaded length of shaft 18. Each downward or upward stroke propels the spool in the reeling in direction and as the operator, in executing this manœuver, is not required to remove his hands from the hand grips 14 and 16 a very convenient arrangement is hereby provided.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus fully described my invention, what I claim as new and desire to secure by Letters Patent is:

1. The combination with a fishing rod and reel, a tubular slotted shaft for the reel, a release rod and a rigid cross pin reciprocable in said shaft, and means for operating the shaft, of a clutch-head forming part of the reel, a clutch plate rigid with said pin, a spring device for holding said plate in engagement with the clutch-head, a pivoted lever mounted in the fishing rod, and a pivotal connection between said lever and the release rod.

2. In a fishing reel, the combination with an operating shaft, a reel shaft disposed at right angles thereto, and driving connections between the shafts, of a reel loose on the reel shaft and having a friction clutch head, a clutch plate on the reel shaft, a resilient pressure disk on the reel shaft and co-acting with said clutch plate to retard movement of the reel, and manually operated means for disengaging said disk from said plate.

3. In a fishing reel, the combination with a supporting tube and an operating shaft mounted therein, a reel frame rigid with the tube, a reel shaft mounted in the frame at right angles to the operating shaft and driving connections between said shafts, of a reel loosely mounted on the reel shaft, a spring pressed friction clutch mounted between the reel shaft and the reel, means for releasing the clutch, and manually operated means mounted in the tube for actuating the release means.

4. The combination with an operating shaft, a reel shaft disposed at right angles thereto, and driving connections between said shafts, of a reel loose on the reel shaft, a cupped end plate on the reel forming a clutch-head, a cup plate rotatable with and slidable on the reel shaft, an inverted cup-shaped resilient disk bearing on the clutch plate to engage the latter with the clutch head, and manually operated means for disengaging the plate from the head.

JOSEPH CALVIN BERRY.